United States Patent
Yamada et al.

(10) Patent No.: US 9,556,818 B2
(45) Date of Patent: Jan. 31, 2017

(54) TWO-STROKE UNIFLOW ENGINE

(71) Applicant: IHI Corporation, Tokyo (JP)

(72) Inventors: Takayuki Yamada, Tokyo (JP);
Takayuki Hirose, Tokyo (JP); Yasunori Ashikaga, Tokyo (JP); Takahiro Kuge, Tokyo (JP); Takeshi Yamada, Tokyo (JP)

(73) Assignee: IHI CORPORATION, Tokyo (JP)

( * ) Notice: Subject to any disclaimer, the term of this patent is extended or adjusted under 35 U.S.C. 154(b) by 69 days.

(21) Appl. No.: 14/559,555

(22) Filed: Dec. 3, 2014

(65) Prior Publication Data
US 2015/0075485 A1 Mar. 19, 2015

Related U.S. Application Data

(63) Continuation of application No. PCT/JP2013/065757, filed on Jun. 6, 2013.

(30) Foreign Application Priority Data

Jun. 6, 2012 (JP) .................................. 2012-128925

(51) Int. Cl.
*F02M 69/10* (2006.01)
*F02D 41/34* (2006.01)
(Continued)

(52) U.S. Cl.
CPC ................. *F02D 41/34* (2013.01); *F02B 1/10* (2013.01); *F02B 25/04* (2013.01); *F02B 75/02* (2013.01);
(Continued)

(58) Field of Classification Search
CPC .... F02D 41/34; F02D 41/345; F02D 41/0025; F02D 41/0027; F02D 35/023; F02D 35/024; F02D 19/0692; F02D 19/061; F02D 19/10; F02D 2250/31; F02D 2041/389; F02B 75/02; F02B 1/10; F02B 25/04; F02B 2075/025; Y02T 10/44; Y02T 10/36
(Continued)

(56) References Cited

U.S. PATENT DOCUMENTS 5,035,206 A 7/1991 Welch et al.
5,063,886 A 11/1991 Kanamaru et al.
(Continued)

FOREIGN PATENT DOCUMENTS

CN 1119240 A 3/1996
CN 102472161 A 5/2012
(Continued)

OTHER PUBLICATIONS

International Search Report mailed Jul. 16, 2013 in PCT/JP2013/065757 (2 pages).

*Primary Examiner* — Hai Huynh
(74) *Attorney, Agent, or Firm* — Rothwell, Figg, Ernst & Manbeck, P.C.

(57) ABSTRACT

A two-stroke uniflow engine is provided with: a cylinder; a piston; an exhaust valve that is opened and closed in order to discharge exhaust gas that is generated inside the cylinder; a scavenging port that takes active gas into the interior of the cylinder in accordance with a sliding movement of the piston; a fuel injection port that is provided in the internal circumferential surface of the cylinder; a fuel injection valve that injects fuel gas into the fuel injection port; and a fuel injection control unit that executes control of the injection of the fuel gas in the fuel injection valve, wherein the fuel injection control unit decides at least one of an injection pressure and an injection time of the fuel injection valve (Continued)

based on a change in pressure inside the cylinder that is caused by a reciprocating movement of the piston.

2 Claims, 9 Drawing Sheets

(51) Int. Cl.
| | | |
|---|---|---|
| *F02B 25/04* | (2006.01) | |
| *F02D 19/10* | (2006.01) | |
| *F02D 19/06* | (2006.01) | |
| *F02D 41/00* | (2006.01) | |
| *F02B 1/10* | (2006.01) | |
| *F02D 35/02* | (2006.01) | |
| *F02B 75/02* | (2006.01) | |
| *F02D 41/38* | (2006.01) | |

(52) U.S. Cl.
CPC ......... *F02D 19/061* (2013.01); *F02D 19/0689* (2013.01); *F02D 19/0692* (2013.01); *F02D 19/10* (2013.01); *F02D 35/023* (2013.01); *F02D 35/024* (2013.01); *F02D 41/0025* (2013.01); *F02D 41/0027* (2013.01); *F02D 41/345* (2013.01); *F02B 2075/025* (2013.01); *F02D 2041/389* (2013.01); *F02D 2250/31* (2013.01); *F02D 2400/04* (2013.01); *Y02T 10/36* (2013.01); *Y02T 10/44* (2013.01)

(58) Field of Classification Search
USPC ................ 123/435, 73 C, 73 CC, 73 PP, 525
See application file for complete search history.

(56) References Cited

U.S. PATENT DOCUMENTS

| | | | |
|---|---|---|---|
| 5,222,481 A * | 6/1993 | Morikawa | ............. F02D 35/023 123/435 |
| 5,243,947 A | 9/1993 | Yamamoto et al. | |
| 5,582,151 A | 12/1996 | Wertheimer | |
| 5,623,909 A | 4/1997 | Wertheimer | |
| 6,101,989 A | 8/2000 | Green | |
| 6,227,165 B1 | 5/2001 | Motose et al. | |
| 9,169,793 B2 * | 10/2015 | Jung | ....................... F02D 41/30 |
| 2012/0137676 A1 | 6/2012 | Murata et al. | |
| 2015/0167537 A1 | 6/2015 | Masuda et al. | |
| 2015/0167538 A1 | 6/2015 | Masuda et al. | |
| 2015/0176475 A1 | 6/2015 | Masuda et al. | |
| 2015/0260115 A1 | 9/2015 | Masuda et al. | |
| 2016/0061097 A1 | 3/2016 | Kuge et al. | |
| 2016/0061098 A1 | 3/2016 | Kuge et al. | |
| 2016/0061099 A1 | 3/2016 | Kuge et al. | |

FOREIGN PATENT DOCUMENTS

| | | |
|---|---|---|
| EP | 1 959 118 A2 | 8/2008 |
| JP | 64-24113 A | 1/1989 |
| JP | 6-26390 A | 2/1994 |
| JP | 7-174038 A | 7/1995 |
| JP | 8-291769 A | 11/1996 |
| JP | 2004-316456 A | 11/2004 |
| JP | 2006-52686 A | 2/2006 |
| JP | 2007-127005 A | 5/2007 |
| JP | 4312803 B2 | 5/2009 |
| JP | 2012-21434 A | 2/2012 |
| JP | 2012-36780 A | 2/2012 |
| JP | 2012-77742 A | 4/2012 |
| JP | 2012-154189 A | 8/2012 |
| JP | 2013-24136 A | 2/2013 |
| KR | 10-0412722 B1 | 12/2003 |

* cited by examiner

TWO-STROKE UNIFLOW ENGINE

This application is a continuation application based on a PCT Patent Application No. PCT/JP2013/065757, filed Jun. 6, 2013, whose priority is claimed on Japanese Patent Application No. 2012-128925, filed Jun. 6, 2012. The contents of both the PCT application and the Japanese Patent Application are incorporated herein by reference.

TECHNICAL FIELD

The present invention relates to a two-stroke uniflow engine that injects fuel directly into a cylinder.

BACKGROUND ART

Two-stroke engines (i.e., two-cycle engines), which are also used as the engines of sea-going vessels, are reciprocating engines in which the strokes of compression (including air intake) and expansion (including combustion and air discharge) are completed in the strokes of a single reciprocation of a piston inside a cylinder. For example, in a diesel-type gas engine in which diesel fuel oil and fuel gas are supplied concurrently via high-pressure injection, the fuel gas and fuel oil are injected in the vicinity of top dead center in the latter half of a compression stroke, and this fuel gas is then ignited so that the fuel gas is reliably combusted inside the cylinder.

As an example of this type of gas engine, technology has been disclosed (see, for example, Patent document 1) in which high-pressure (for example, 250 bar (25 MPa)) fuel gas is injected from a fuel gas valve that is fitted onto a cylinder cover positioned in the vicinity of top dead center.

In a gas engine that uses this type of high-pressure injection, the air inside the cylinder is compressed while the scavenging port and the exhaust valve are in a closed-off state, and combustion is then induced by injecting fuel gas directly into this high-temperature, highly compressed air. Accordingly, in a gas engine that employs high-pressure injection, because it is necessary to supply fuel gas when the pressure inside the combustion chamber in the latter half of the compression stroke is high, the fuel gas must be supplied at a higher pressure than that inside the combustion chamber, so that a high-output pressure booster is required. Moreover, in addition to initial costs such as this, increases in operating costs and problems about safety have also occurred. Therefore, a low-pressure injection two-stroke engine has been proposed (for example Patent documents 2 and 3) that, while the pressure inside the cylinder is still comparatively low during the initial stages of the compression stroke, injects fuel gas directly into air that has been taken in via the scavenging port without increasing the pressure of the fuel gas.

DOCUMENT OF RELATED ART

Patent Document

[Patent document 1] Japanese Patent No. 4312803
[Patent document 2] Japanese Unexamined Patent Application (JP-A) No. H8-291769
[Patent document 3] U.S. Pat. No. 5,035,206

SUMMARY OF INVENTION

Technical Problem

In this type of low-pressure injection two-stroke engine, because it is necessary for the fuel gas to be injected only into active gas that has been taken in via the scavenging port, and for this to take place while exhaust gases are still not present inside the cylinder, a fuel injection valve (i.e., a fuel injection port) is provided in an internal circumferential surface at a comparatively low-down position of the cylinder interior. Accordingly, fuel gas is injected from the fuel injection valve while the cylinder is still being compressed. The pressure inside the cylinder (i.e., the internal pressure) changes considerably depending on the scavenging air pressure, the period the exhaust valve has been closed for, the engine load, and the crank angle, and it is difficult to supply fuel gas with any degree of stability.

In view of the above-described circumstances, it is an object of the present invention to provide a two-stroke uniflow engine that is able to supply fuel gas appropriately even when the pressure inside a cylinder changes, and that is able to obtain stable combustion characteristics in an engine.

Solution to Problem

In order to solve the above-described problems, a two-stroke uniflow engine according to a first aspect of the present invention is provided with: a cylinder; a piston that slides inside the cylinder; an exhaust valve that is provided at one end portion in a stroke direction of the cylinder, and is opened and closed in order to discharge exhaust gas that is generated inside the cylinder; a scavenging port that is provided in an internal circumferential surface at an end portion on the other side in the stroke direction of the cylinder, and takes active gas into the interior of the cylinder in accordance with the sliding movement of the piston; a fuel injection port that is provided in the internal circumferential surface of the cylinder; a fuel injection valve that injects fuel gas into the fuel injection port; and a fuel injection control unit that executes control of the injection of the fuel gas in the fuel injection valve, wherein the fuel injection control unit decides at least one of an injection pressure and an injection time of the fuel injection valve based on a change in pressure inside the cylinder that is caused by a reciprocating movement of the piston.

The fuel injection control unit of the two-stroke engine according to a second aspect of the present invention predicts the changes in the internal pressure in the cylinder based on the internal pressure in the cylinder when an angle of a crank that converts the reciprocating movement of the piston into an axial rotation movement reaches a predetermined angle.

The predetermined angle of the angle of the crank that converts the reciprocating movement of the piston of the two-stroke engine according to a third aspect of the present invention into an axial rotation movement is an optional angle between a point when the scavenging port changes to a closed state and a point when the fuel injection port changes to a closed state.

The fuel injection control unit of the two-stroke engine according to a fourth aspect of the present invention decides at least one of the injection pressure and the injection time of the fuel injection valve during the next stroke after an arbitrary stroke based on the changes in pressure inside the cylinder during that arbitrary stroke.

Effects of Invention

According to the two-stroke uniflow engine of the present invention, even if the pressure inside a cylinder changes considerably in accordance with the engine load or the crank angle, by setting a suitable injection pressure or injection time so as to correspond to this internal pressure, it is possible to supply an appropriate amount of fuel gas, and to obtain stable combustion characteristics in an engine.

DESCRIPTION OF EMBODIMENTS

A preferred embodiment of the present invention will now be described in detail with reference made to the attached drawings. Dimensions, materials, and other specific numerical values and the like that are shown in this embodiment serve solely as examples that are intended to simplify an understanding of the invention and, unless specifically stated otherwise, are not intended to be limiting of the present invention. Note that in the present specification and drawings, elements having essentially the same functions and structure are given the same descriptive symbols and any duplicated description thereof is omitted. Moreover, elements that are not directly related to the present invention are also omitted from the drawings. Moreover, the term 'a plurality of' in the present invention simply indicates an optional number of at least two or more.

(Two-Stroke Uniflow Engine 100)

Figure 1:
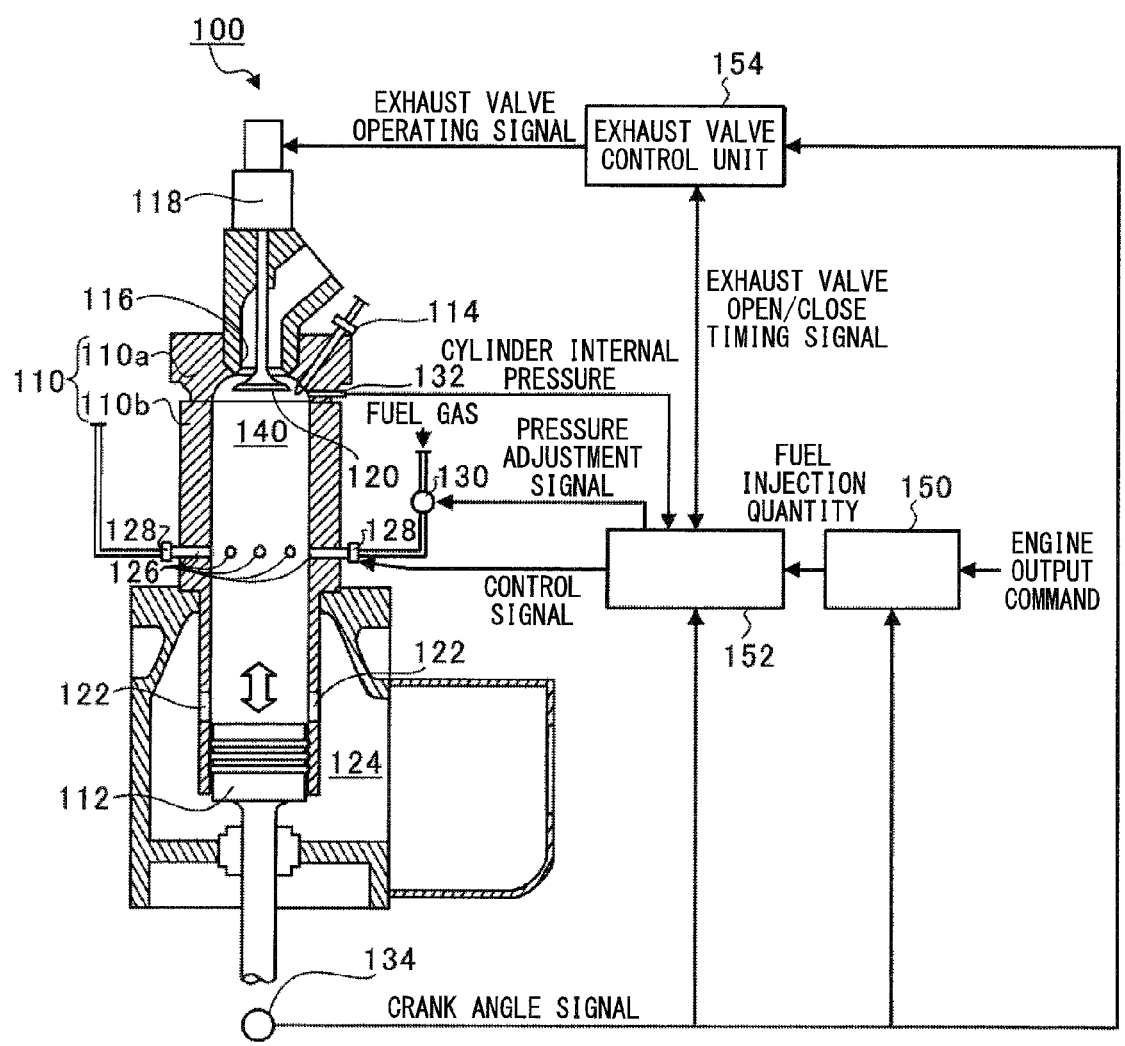
FIG. 1 is an explanatory view showing the overall structure of a two-stroke uniflow engine according to a first embodiment of the present invention.

FIG. 1 is an explanatory view showing the overall structure of a two-stroke uniflow engine 100. The two-stroke uniflow engine 100 of the present embodiment is formed by a two-stroke, uniflow type of dual fuel engine, and is used, for example, in a sea-going vessel or the like. The reason for using a two-stroke uniflow engine in a sea-going vessel is that this engine has high levels of thermal efficiency and reliability.

The aforementioned uniflow type of engine employs a system in which active gas is taken in from a scavenging port located in the bottom portion of the cylinder and combusted gas is then expelled from an exhaust valve located in the top portion of the cylinder, and the flows of the active gas and the exhaust gas are in the same direction. Because of this, only a low proportion of the exhaust gas remains in the cylinder, and this is particularly effective in long-stroke engines.

The reason why a dual fuel engine was used for the two-stroke engine of the present embodiment is as follows. Namely, from the year 2000 onwards, exhaust gas regulations (i.e., NOx regulations) have been imposed by the IMO (International Maritime Organization) for sea-going vessels as well, and the introduction of the third stage of regulations is planned for 2016. In these third stage regulations, the regulation values for specified coastal marines areas are different from those for the open sea, and the regulation values for specified coastal marines areas are far stricter. Therefore, in the present embodiment, a duel fuel engine is employed that is capable of operating in both a gas operating mode and a diesel operating mode. By using this type of engine, in regulated marine areas having strict regulation values, vessels are able to operate in a gas operating mode in which LNG (Liquefied Natural Gas) is used as a fuel as this enables NOx to be reduced, while in areas outside the regulated marine areas, vessels are able to operate in a diesel operating mode in which highly efficient diesel fuel oil is used as a fuel.

Specifically, the two-stroke uniflow engine 100 is constructed so as to include with a plurality of cylinders 110 that are formed by a cylinder head 110a and a cylinder block 110b, and with a piston 112, a pilot injection valve 114, an exhaust port 116, an exhaust valve drive apparatus 118, an exhaust valve 120, a scavenging port 122, a scavenging chamber 124, fuel injection ports 126, fuel injection valves 128, a pressure governor 130, a cylinder internal pressure sensor 132, and a rotary encoder 134 that are provided respectively for each one of the plurality of cylinders 110. The two-stroke uniflow engine 100 is controlled by control units such as a governor (i.e., a speed governor) 150, a fuel injection control unit 152, and an exhaust control unit 154 and the like.

In the two-stroke uniflow engine 100, the piston 112, which is linked to a cross head (not shown), moves reciprocatingly so as to slide freely inside the cylinder 110 via the strokes of compression (including air intake) and expansion (including combustion and air discharge). However, the air intake and air discharge steps extend from the latter half of the expansion stroke through the first half of the compression stroke, and, here, this is referred to as scavenging. In this crosshead-type piston 112, the stroke inside the cylinder 110 is comparatively long, and because it is possible to force the lateral pressure acting on the piston 112 to be received by the crosshead, the output from the two-stroke uniflow engine 100 can be increased. Furthermore, because the cylinder 110 and a crank chamber (not shown) that houses the crosshead are isolated from each other, it is possible to prevent deterioration from contamination even if a low-quality fuel oil is used.

The pilot injection valve 114 is provided in the cylinder head 110a that is located above the top dead center of the piston 112 which is one end portion in the stroke direction of the cylinder 110, and injects a suitable quantity of diesel fuel oil at a desired point in time in the engine cycle. This diesel fuel oil is ignited naturally by the heat of a combustion chamber 140 that is enclosed by the cylinder head 110a, by a cylinder liner of the cylinder block 110, and by the piston 112. The diesel fuel oil then combusts for a very short time, and raises the temperature in the combustion chamber 140 to an extremely high temperature. As a result, the gas premixture, which contains fuel gas, can be reliably combusted at a desired timing. Note that the ignition system is not limited to the above-described diesel fuel oil injection, and a variety of existing systems such as a spark plug ignition system, a laser ignition system, and a plasma ignition system and the like may also be employed.

The exhaust port 116 is an aperture portion that is provided in an apex portion of the cylinder head 110a that is located above the top dead center of the piston 112 which is one end portion in the stroke direction of the cylinder 110. The exhaust port 116 serves as a path for discharging exhaust gases after the combustion generated inside the cylinder 110. The exhaust valve drive apparatus 118 causes the exhaust valve 120 to slide up and down at predetermined timings so as to open and close the exhaust port 116. The exhaust gas that has been discharged via the exhaust port 116 in this manner is supplied, for example, to the turbine side of a supercharger (not shown), and is then discharged to the outside.

The scavenging port 122 is an aperture portion that is provided in an internal circumferential surface in another end portion side (i.e., the bottom dead center side), which is located opposite the one end portion where the exhaust port 116 is provided, in the stroke direction of the cylinder block 110b, and takes active gas into the interior of the cylinder 110 in accordance with the sliding operation of the piston 112. This active gas contains oxygen, an oxidizing agent such as ozone, or a gas mixture thereof (for example, air). The active gas (for example, air) that has been compressed by a compressor of a supercharger (not shown) is enclosed inside the scavenging chamber 124, and the active gas is taken in from the scavenging port 124 by the pressure difference between the scavenging chamber 124 and the interior of the cylinder 110. Although the pressure inside the scavenging chamber 124 can be kept substantially uniform, if there are changes in the pressure inside the scavenging chamber 124 then it is also possible to provide a pressure gauge in the scavenging port 122, and to control other parameters, such as the quantity of fuel gas that is injected in accordance with the measurement values.

The fuel injection ports 126 are a plurality of aperture portions that are provided a predetermined distance apart from each other in a circumferential direction in a middle portion (i.e., between the exhaust port 116 and the scavenging port 122) of the internal circumferential surface of the cylinder 110. The fuel injection valves 128 are located inside the fuel injection ports 126 and, upon receiving control signals from the fuel injection control unit 152, inject fuel gas obtained, for example, by gasifying LNG (Liquid Natural Gas). The pressure governor 130 receives pressure adjustment signals from the fuel injection control unit 152, and adjusts the pressure of the fuel gas that is sent to the fuel injection valves 128. In this manner, fuel gas is supplied to the interior of the cylinder 110. Moreover, the fuel gas is not limited to LNG and is also possible to use other gasified fuels such as, for example, LPG (Liquefied Petroleum Gas), light oil, and heavy oil and the like.

The cylinder internal pressure sensor 132 is provided in the cylinder head 110a that is located above the top dead center of the piston 112, which is one end portion in the stroke direction of the cylinder 110, and directly measures the pressure inside the cylinder 110, and then transmits the measurement results to the fuel injection control unit 152. The rotary encoder 134 is provided on a crank (not shown) that converts the reciprocating movement of the piston 112 into an axial rotation movement (i.e., a rotation movement that is centered on the crank shaft), and detects angle signals of the crank (hereinafter, these will be referred to as crank angle signals). In the two-stroke uniflow engine 100, during the time it takes for the crank angle (i.e., the output shaft) to rotate 360°, the piston performs one reciprocation (i.e., 0°~180° for the upward stroke, and 180°~360° for the downward stroke), and the compression and expansion strokes are concluded by this single reciprocation. Accordingly, by detecting the crank angle, the current position of the piston 112 inside the cylinder 110 can be uniquely specified.

The governor 150 derives fuel injection quantities based on engine output command values that are input from a high order control device, and on the engine revolution speed that is based on the crank angle signals from the rotary encoder 134, and then outputs the fuel injection quantities to the fuel injection control unit 152. Based on information showing the fuel injection quantities input from the governor 150, and on the crank angle signals from the rotary encoder 134, the fuel injection control unit 152 controls (i.e., performs injection control for) the fuel gas injection pressure (i.e., the supply pressure) and the injection time (i.e., the injection start timing and the injection end timing) in the fuel injection valves 128.

The exhaust control unit 154 outputs exhaust valve operating signals to the exhaust valve drive apparatus 118 based on exhaust valve open/close timing signals from the fuel injection control unit 152, and on the crank angle signals from the rotary encoder 134. Hereinafter, operations of the respective control units in an engine cycle of the above-described two-stroke uniflow engine 100 will be described.

(Operations of the Respective Control Units in an Engine Cycle)

Figure 2A:
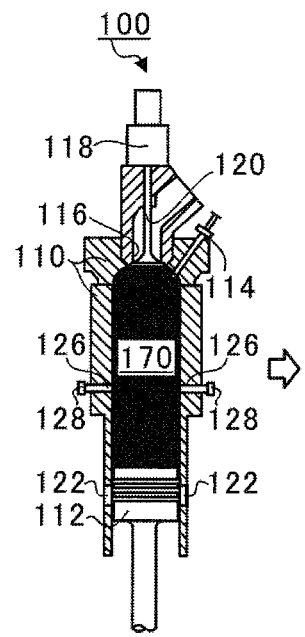
FIG. 2A is an explanatory view illustrating an operation of each control portion in the two-stroke uniflow engine according to the first embodiment of the present invention.
Figure 2B:
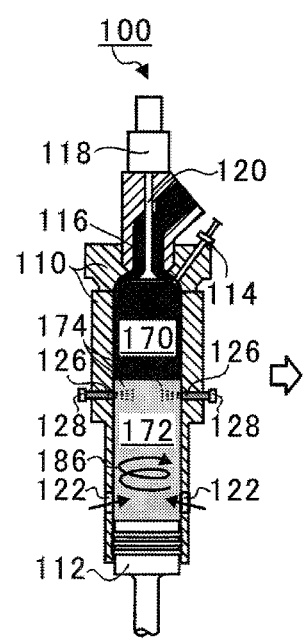
FIG. 2B is an explanatory view illustrating an operation of each control portion in the two-stroke uniflow engine according to the first embodiment of the present invention.
Figure 2C:
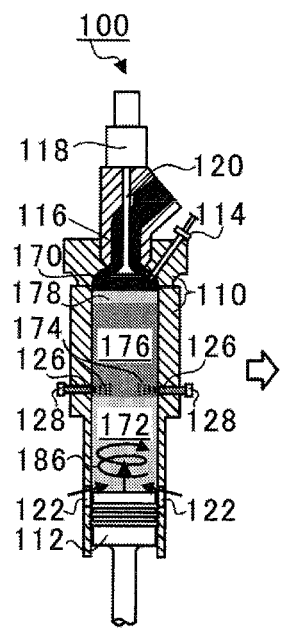
FIG. 2C is an explanatory view illustrating an operation of each control portion in the two-stroke uniflow engine according to the first embodiment of the present invention.
Figure 2D:
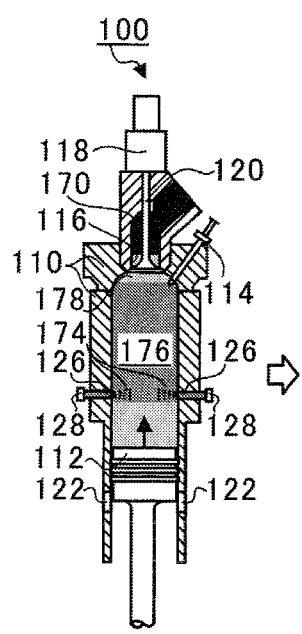
FIG. 2D is an explanatory view illustrating an operation of each control portion in the two-stroke uniflow engine according to the first embodiment of the present invention.
Figure 2E:
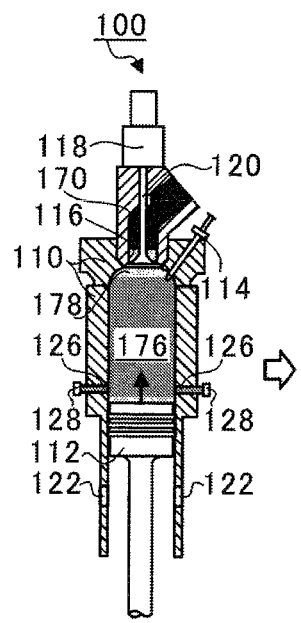
FIG. 2E is an explanatory view illustrating an operation of each control portion in the two-stroke uniflow engine according to the first embodiment of the present invention.
Figure 2F:
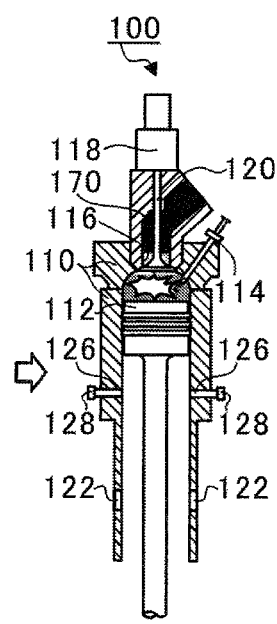
FIG. 2F is an explanatory view illustrating an operation of each control portion in the two-stroke uniflow engine according to the first embodiment of the present invention.
Figure 2G:
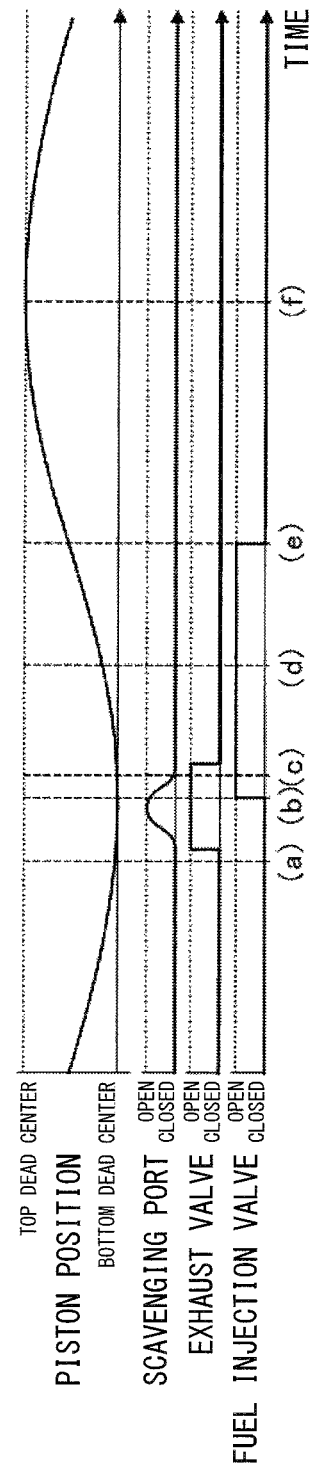
FIG. 2G is an explanatory view illustrating an operation of each control portion in the two-stroke uniflow engine according to the first embodiment of the present invention.

FIGS. 2A through 2G are explanatory views illustrating operations of each control unit of the two-stroke uniflow engine 100 of the present embodiment. FIGS. 2A through 2F, in particular, are vertical cross-sectional views of the two-stroke uniflow engine 100, while FIG. 2G is a timing chart showing a temporal relationship between the states shown in FIGS. 2A through 2F. In FIGS. 2A through 2F, the strokes of compression (including air intake) and expansion (including combustion and air discharge) in the two-stroke uniflow engine 100 are described in the sequence of exhaust and intake, compression, and combustion.

In the first stages of the expansion stroke, as is shown in FIG. 2A, the exhaust valve 120 and the scavenging port 122 are in a closed-off state, and the interior of the cylinder 110 is filled with exhaust gas 170. When the piston 112 is pushed down by the combustion pressure and approaches the bottom dead center, the exhaust control unit 154 opens up the exhaust valve 120 via the exhaust valve drive apparatus 118, and the scavenging port 122 opens in accordance with the sliding operation of the piston 112. As a result, as is shown in FIG. 2B, active gas 172 is taken in through the scavenging port 122, and the active gas rises up while forming a swirl 186 that promotes its mixing with the fuel gas. The exhaust gas 170 inside the cylinder 110 is then expelled from the exhaust port 116.

As is shown in FIG. 2B, when a boundary between the exhaust gas 170 and the active gas 172, which is created by the introduction of the active gas 172, reaches as far as the fuel injection ports 126, the fuel injection control unit 152 starts the injecting of the fuel gas 174 into the fuel injection valves 128 at a predetermined injection pressure. At this time, the exhaust valve 120 and the scavenging port 122 are open, and the pressure inside the cylinder 110 is still low. Consequently, even if high pressure is not applied to the fuel injection valves 128 (i.e., while the fuel injection valves 128 are at low pressure), the fuel injection valves 128 are still able to properly inject fuel gas. Because of this, there is no need to provide a high-output pressure booster.

However, if the timing of the injection of fuel gas is too early, the fuel gas 174 comes into contact with the high-temperature exhaust gas 170 that still remains inside the combustion chamber 140 of the cylinder 110, and heat from the exhaust gas 170 is transmitted to the fuel gas 174. This leads to the possibility of premature ignition occurring. Therefore, in the present embodiment, as is shown in FIG. 2B, after the active gas 172 from the scavenging port 122 has reached the fuel injection ports 126, the fuel injection control unit 152 waits for a further predetermined time to elapse before injecting the fuel gas 174. As a result of this, as is shown in FIG. 2C, a narrow interposed layer 178, whose principal constituent is the active gas 172 without any fuel gas 174 mixed therein, is created between the exhaust gas 170 and a gas premixture 176 that is created by mixing together the fuel gas 174 and the active gas 172.

When the narrow interposed layer 178 is created in this way between the exhaust gas 170 and the gas premixture 176, the exhaust gas 170 can be discharged from the exhaust port 116 without the high-temperature exhaust gas 170 coming into contact with the gas premixture 176. Here, because the narrow interposed layer 178 is sufficiently thick, even if fluctuations occur in the boundary face between the exhaust gas 170 and the narrow interposed layer 178, it is still possible to prevent the gas premixture 176 from reaching a high temperature.

Next, when the discharging of the exhaust gas 170 is complete, as is shown in FIG. 2D, the exhaust valve drive apparatus 118 closes the exhaust valve 120, so that the scavenging port 122 is also closed by the piston 112 which has rolled over to its compression stroke. Here, by closing the exhaust valve 120 at the point when a portion of the narrow interposed layer 178 has been discharged from the exhaust port 116, the exhaust gas 170 that has already been mixed into the narrow interposed layer 178 can be completely discharged with none remaining inside the cylinder 110. Moreover, the gas premixture 176 can be left behind appropriately inside the cylinder 110, without any of this gas premixture 176 being discharged from the exhaust port 116. In this way, premature ignition is prevented, and a stabilization of the engine driving can be achieved.

The fuel injection control unit 152 continues to inject the fuel gas 174 through the fuel injection valves 128, and, as is shown in FIG. 2E, stops the injecting of the fuel gas before the piston 112 reaches the fuel injection ports 126. In this way, after the injection of fuel gas by the fuel injection control unit 152 has been completed once, the gas premixture 176 is compressed to a high pressure via a further compression stroke, and the gas premixture 176 is ignited again based on the injection of diesel fuel oil from the pilot injection valve 114, and, as is shown in FIG. 2F, the gas premixture is combusted. The piston 112 is then pushed down again by the combustion such that it returns to the state shown in FIG. 2A, and thereafter, the compression and expansion strokes are repeated.

In this way, in the two-stroke uniflow engine 100 of the present embodiment, because the fuel injection valves 128 are provided in the middle portion of the internal circumferential surface of the cylinder 110, while exhaust gas is still remaining inside the cylinder 110, it is possible to supply the fuel gas 174 only to the active gas 172 that has been taken in through the scavenging port 122, so that, consequently, operating the engine based on low-pressure fuel injection (for example, 10 bars (1 MPa)) becomes possible.

In the present embodiment, a further aim of this two-stroke uniflow engine 100 is to control the injection quantities (i.e., the injection pressure and the injection time) of the fuel injection valves 128 based on changes in the pressure inside the cylinder 110 that occur because of the reciprocating motion of the piston 112. However, the injection control must be performed within the physical limitations given below.

(Physical Limits)

Figure 3:
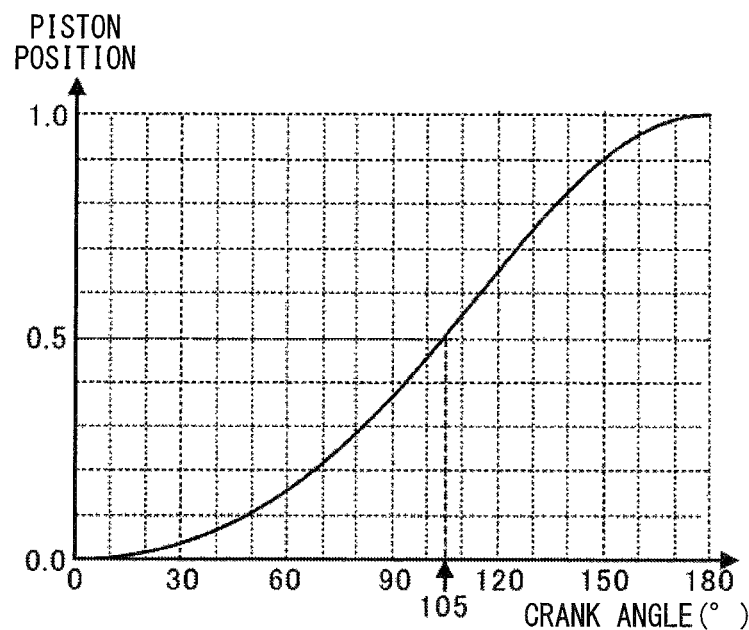
FIG. 3 is an explanatory view showing a relationship between a crank angle and a piston position according to the first embodiment of the present invention.

FIG. 3 is an explanatory view showing a relationship between a crank angle and a piston position. Here, the rising stroke of the piston is shown, and the crank angle transits from 0° to 180°. Moreover, the position of the piston 112 is shown with the position of the piston at bottom dead center inside the cylinder 110 taken as 0.0, and the position of the piston at top dead center taken as 1.0. It is necessary for the fuel injection ports 126 to be provided at a sufficiently low position (i.e., minimum piston position) relative to the transition of the piston 112 to enable the narrow interposed layer 178 to be properly formed, and at a sufficiently high position (maximum piston position) to enable an adequate injection time to be secured for the fuel gas 174.

If it is assumed that the fuel injection ports 126 are provided at a position where the piston position is 0.5 (i.e., where the crank angle is 105°), then the time for which the fuel injection control unit 152 is able to cause the fuel injection valves 128 to inject fuel is limited to a time from when the scavenging port 122 is placed in a closed state (for example, when the crank angle is 10°) by the sliding movement of the piston 112 until the fuel injection ports 126 are placed in a closed state (for example, when the crank angle is 105°). Here, the reason why the fuel injection time starts from when the scavenging port 122 is placed in a closed state is because if the fuel gas 174 is supplied too early, there is a possibility that the fuel gas 174 will be blown out from the exhaust valve 120, while if the fuel gas 174 is supplied while the scavenging port 122 is in an open state, there is a possibility that the active gas 172 and the fuel gas 174 will end up flowing back into the scavenging port 122.

(Injection Control)

The fuel injection control unit 152 controls the injection pressure and the injection time of the fuel injection valves 128 under the above-described physical limitations (for example, between crank angles of 10° and 105°) based on changes in the pressure inside the cylinder 110 that are generated by the reciprocating movement of the piston 112.

Figure 4:
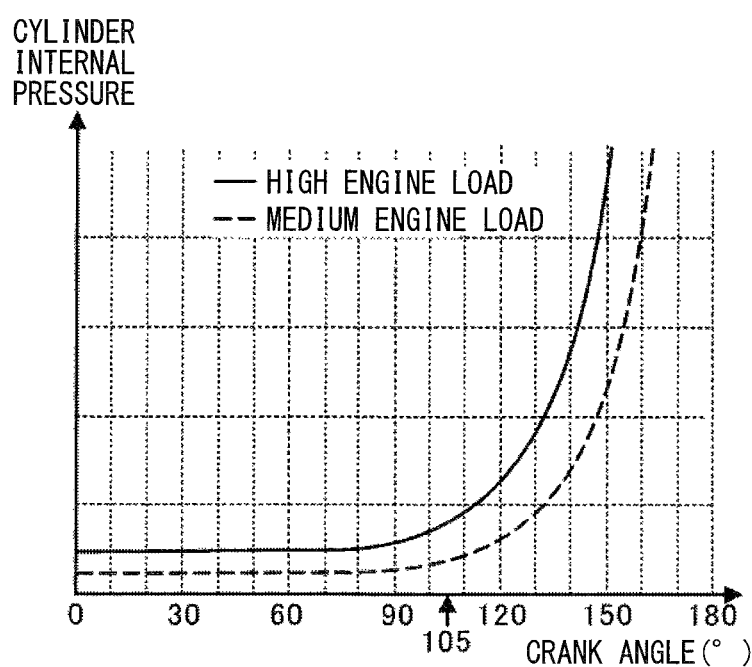
FIG. 4 is an explanatory view showing a crank angle and a pressure trend inside a cylinder according to the first embodiment of the present invention.

FIG. 4 is an explanatory view showing the crank angle and a trend of the pressure inside the cylinder 110. As can be understood by referring to FIG. 4, the greater the crank angle, the higher the pressure inside the cylinder 110.

Moreover, the trend of this change deviates further to the high pressure side as the engine load increases. The fuel injection control unit 152 measures the pressure inside the cylinder 110 which changes in the manner shown in FIG. 4 via the cylinder internal pressure sensor 132 and the like and, based on the changes in the pressure inside the cylinder 110, controls the injection pressure and the injection time of the fuel gas 174 by the fuel injection valves 128 so that the desired injection quantity is obtained. Here, the reason why this control is based on the changes in pressure inside the cylinder 110 is as follows.

Namely, the reason is that in a conventional high-pressure injection two-stroke engine, when the fuel gas 174 is injected for a short time at a fuel gas pressure that is sufficiently higher than the pressure inside the cylinder during the period when there is essentially no change in the pressure inside the cylinder which is at top dead center, in a low-pressure injection such as in the present embodiment, because the fuel gas 174 is injected for a comparatively long time during the period when the change in the pressure inside the cylinder 110 when the piston 112 is on the upward stroke is large, the change in the pressure inside the cylinder 110 greatly affects the injection quantity. By performing injection control based on changes in the pressure inside the cylinder, even if the pressure inside the cylinder 110 does change, it is still possible to supply fuel gas appropriately and obtain stable combustion characteristics in the engine.

However, if the pressure inside the cylinder 110 is measured sequentially, and the injection control (i.e., a closed loop control) of the fuel injection valves 128 is performed in accordance with this measurement, then the processing load increases unnecessarily and, depending on the processing capability of the fuel injection control unit 152, there is a possibility that the injection control will be performed too late. Therefore, one method that might be considered is to ascertain the engine load and then predict the change in the pressure inside the cylinder 110 based on the engine load, and to then control the injection using the predicted trend of the change.

As is shown in FIG. 4, the trend of the pressure change inside the cylinder 110 varies in accordance with the engine load and, for example, the higher the engine load, the more the pressure change trends towards a higher pressure. Accordingly, as long as it is possible to ascertain the engine load, it is possible to predict the trend of the pressure change inside the cylinder 110 with reasonable accuracy. The engine load can be ascertained from the scavenging air pressure as is shown below.

Figure 5A:
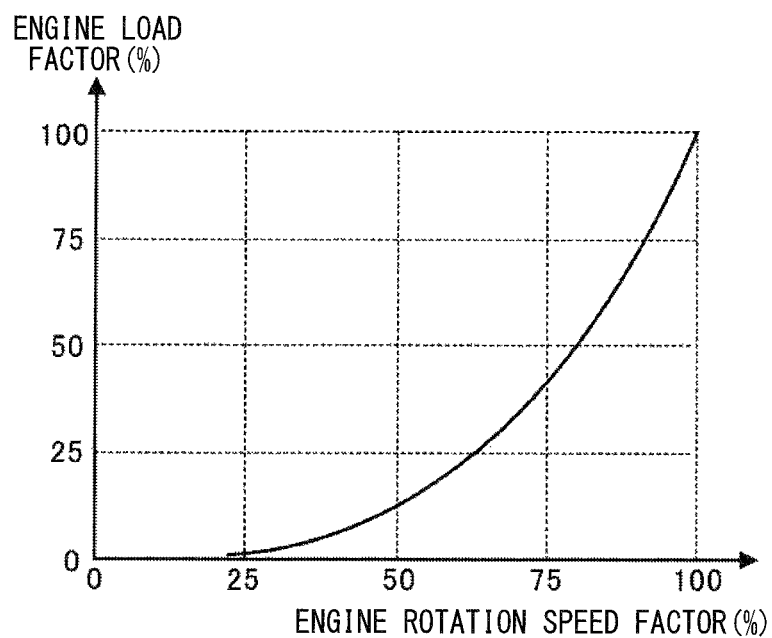
FIG. 5A is an explanatory view illustrating a relationship between an engine load and a scavenging air pressure according to the first embodiment of the present invention.
Figure 5B:
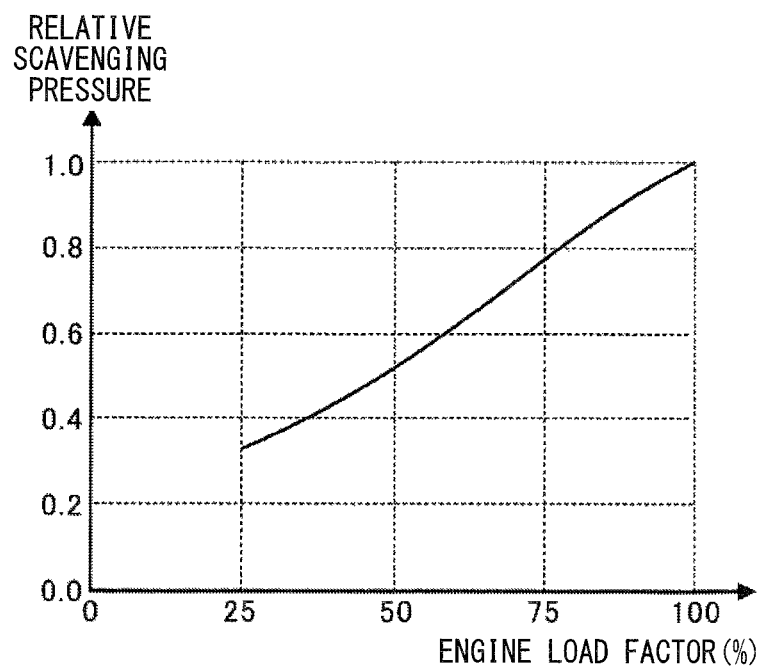
FIG. 5B is an explanatory view illustrating a relationship between an engine load and a scavenging air pressure according to the first embodiment of the present invention.

FIGS. 5A and 5B are explanatory views illustrating a relationship between the engine load and the scavenging air pressure. In particular, in FIG. 5A, a relationship between the engine rotation speed factor and the engine load factor is shown, while in FIG. 5B a relationship between the engine load factor and the relative scavenging air pressure which is expressed as a ratio relative to the assumed maximum scavenging air pressure (i.e., the scavenging air pressure when the engine load is 100%) is shown. As is shown in FIG. 5A, as the engine rotation speed factor increases, the engine load factor increases, while, as is shown in FIG. 5B, the relative scavenging air pressure (i.e., the supercharging pressure) changes in accordance with the change in the engine load factor. Accordingly, it can be understood that the engine load can be ascertained from the scavenging air pressure.

Accordingly, instead of the engine load, it is possible to predict the trend of the pressure change inside the cylinder 110 using the scavenging air pressure. The scavenging air pressure is equivalent to the pressure inside the cylinder 110 when the scavenging port 122 is in an open state (i.e., when the cylinder 110 and the scavenging chamber 124 are in communication with each other). Therefore, consideration might be given to a method in which the fuel injection control unit 152 acquires from the cylinder internal pressure sensor 132 the internal pressure inside the cylinder 110 when the scavenging port 122 is open, and then predicts the change in the internal pressure inside the cylinder 110 based on the acquired measurement value for the internal pressure inside the cylinder 110. Note that if a scavenging air pressure sensor is provided in the scavenging chamber, then it would also be possible to acquire the scavenging air pressure directly from that scavenging air pressure sensor.

However, in the present embodiment, as is shown in FIG. 2G, the timing at which the exhaust valve 120 changes to a closed state is later than the timing at which the scavenging port 122 changes to a closed state. Moreover, because the timing when the exhaust valve 120 is changed to a closed state varies in some cases depending on the engine load, even if the scavenging port 122 is closed there are cases in which the pressure inside the cylinder 110 traces a rising trend until the exhaust valve 120 changes to a closed state. Accordingly, the predetermined crank angle at which the pressure inside the cylinder 110 is measured, instead of being the angle at the point when the scavenging port 122 is in a closed state, is desirably set to an optional angle between the point when the exhaust valve 120 changes to a closed state and the point when the fuel injection ports 126 changes to a closed state.

Figure 6:
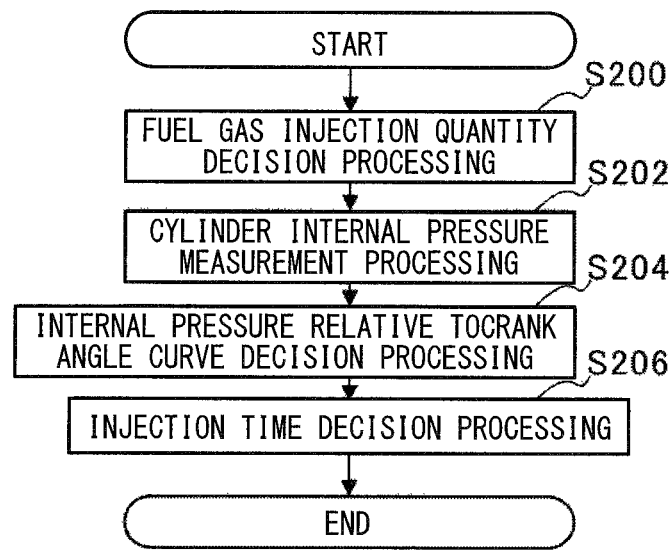
FIG. 6 is a flowchart showing an overall processing flow of injection control in the two-stroke uniflow engine according to the first embodiment of the present invention.

FIG. 6 is a flowchart showing the overall processing flow of the injection control in the two-stroke uniflow engine 100. Here, the detailed processing of the injection control in the two-stroke uniflow engine 100 will be described following FIG. 6.

(Injection Quantity Decision Processing S200 for the Fuel Gas 174)

The governor 150 calculates the injection quantity of the fuel gas 174 based on engine output command values and on the engine rotation speed that is obtained from crank angle signals output from the rotary encoder 134, and outputs the result to the fuel injection control unit 152.

(Cylinder 110 Internal Pressure Measurement Processing S202)

When the crank angle reaches a predetermined value (for example, 20° immediately after the exhaust valve 120 has changed to a closed state), the fuel injection control unit 152 directly measures the pressure inside the cylinder 110 via the cylinder internal pressure sensor 132.

(Internal Pressure Relative to Crank Angle Curve Decision Processing S204)

The fuel injection control unit 152 decides a curve of the internal pressure relative to the crank angle based on the pressure inside the cylinder 110 that was measured via the cylinder internal pressure sensor 132.

Figure 7:
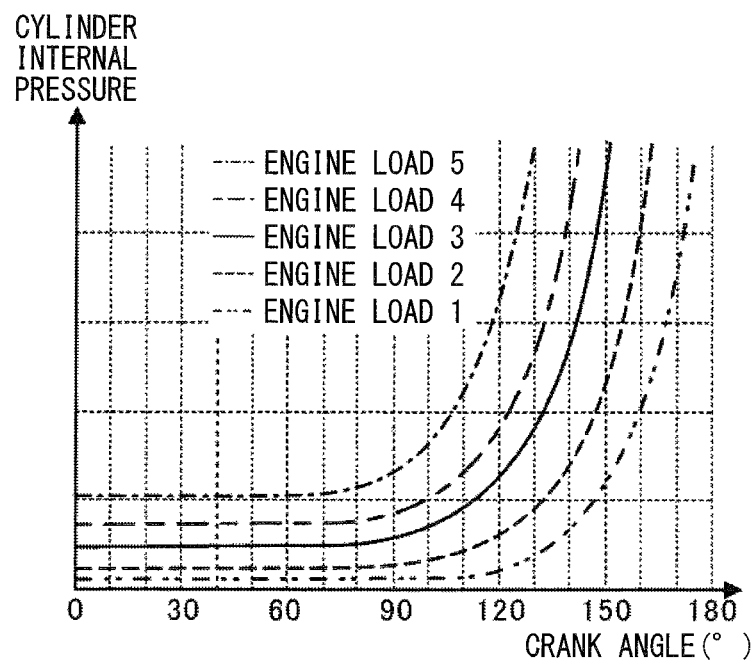
FIG. 7 is an explanatory view illustrating decision processing for an internal pressure relative to crank angle curve according to the first embodiment of the present invention.

FIG. 7 is an explanatory view illustrating the decision processing for a curve of the internal pressure relative to the crank angle. Here, a plurality of curves of the internal pressure relative to the crank angle such as those shown in FIG. 7 (i.e., engine loads 1~5) are prepared in advance. Because the cylinder 110 is tightly closed after the exhaust valve 120 has changed to a closed state, the curve of the internal pressure relative to the crank angle largely follows the trend shown in FIG. 7. In accordance with the pressure inside the cylinder 110 when the crank angle is 20°, the fuel injection control unit 152 selects one internal pressure relative to crank angle curve from among the plurality of internal pressure relative to crank angle curves. Here, it will be assumed that the internal pressure relative to crank angle curve for the engine load 3 has been decided.

However, when the number of internal pressure relative to crank angle curves is limited in the manner shown in FIG. 7, there may be cases when none of the internal pressure relative to crank angle curves correspond to the measured pressure inside the cylinder 110. In this case, it is possible to interpolate, from among the pressures inside the cylinder 110 when the crank angle is 20° from the prepared plurality of internal pressure relative to crank angle curves, an internal pressure relative to crank angle curve for pressure that is higher than and analogous to the measured pressure inside the cylinder 110, and an internal pressure relative to crank angle curve for pressure that is lower than and analogous to the measured pressure inside the cylinder 110, and to thereby create an internal pressure relative to crank angle curve for the measured pressure inside the cylinder 110. Linear interpolation or another known interpolation technique may be used for this interpolation.

(Injection Time Decision Processing S206)

Next, based on the decided internal pressure relative to crank angle curve, the fuel injection control unit 152 decides at least one of the injection pressure and the injection time of the fuel injection valves 128. In the present embodiment, in order to simplify understanding, the injection pressure is fixed as a predetermined pressure that is higher than the pressure inside the cylinder 110 up until the point when the crank angle reaches the fuel injection ports 126, and only the injection time (i.e., the injection start timing and the injection ends timing) is decided. Here, the supply pressure of the fuel gas 174 is kept sufficiently higher than the pressure inside the cylinder 110 by the pressure governor 130 until the crank angle reaches the fuel injection ports 126.

Figure 8:
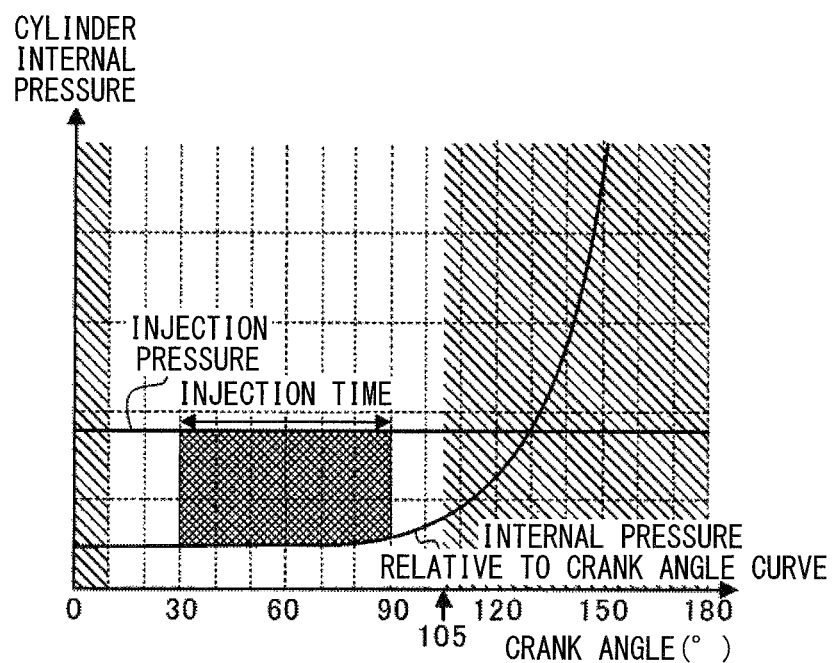
FIG. 8 is an explanatory view illustrating decision processing for an injection time of a fuel injection valve according to the first embodiment of the present invention.

FIG. 8 is an explanatory view illustrating the decision processing for the injection time of the fuel injection valves 128. The internal pressure relative to crank angle curve shown in FIG. 8 is an internal pressure relative to crank angle curve for the engine load 3 shown in FIG. 7. A short-time span injection quantity $M_{inj}$ of the fuel gas 174 can be derived from the following Formula 1, which is based on an injection pressure $P_0$ and on a pressure shown by the internal pressure relative to crank angle curve $P_1(t)$, and the total injection quantity of the fuel gas 174 is a value obtained by accumulating the injection quantities shown in Formula 1 for the overall period of the injection.

[Formula 1]

$$M_{inj} = A_0 \sqrt{\frac{2\gamma \cdot P_0 \cdot \rho_0}{\gamma - 1} \left(\frac{P_1(t)}{P_0}\right)^{\frac{2}{\gamma}} \left\{1 - \left(\frac{P_1(t)}{P_0}\right)^{\frac{\gamma-1}{\gamma}}\right\}} \times t \quad \text{(Formula 1)}$$

wherein $M_{inj}$ is the fuel gas injection quantity [kg], $A_0$ is the effective nozzle area [m²], γ is the specific heat ratio [-] of the fuel gas, $P_0$ is the fuel gas pressure (i.e., injection pressure) [Pa] at the nozzle intake port, $P_1(t)$ is the fuel gas pressure (i.e., the pressure shown by the internal pressure relative to crank angle curve) [Pa] at the nozzle discharge port, ρ0 is the density [kg/m³] of the fuel gas, and t is the injection period [s].

Accordingly, the fuel injection control unit 152 inversely calculates the injection amount of fuel gas 174 that was decided by the governor 150, and decides the injection start timing and the injection end timing such that the total injection quantity calculated by accumulating Formula 1 is equivalent to the target injection quantity. For example, in the example shown in FIG. 8, the injection start timing is taken as 30°, and considering the injection quantity the injection end timing is taken as being 90°. At this time the injection start timing may be taken as being between 10° and 40°, and may be fixed at a constant of, for example, 30° or the like. The reason why the injection start timing is taken as being between 10° and 40° is because if it is less than 10°, the fuel gas 174 ends up being blown out of the exhaust port 116 by the exhaust flow, and if it is greater than 40°, the injection period of the fuel gas 174 is too short and the quantity of fuel gas 174 supplied does not reach the desired quantity, and there is a possibility that dense concentrations of the fuel gas 174 will occur in localized areas.

Moreover, looking at FIG. 8, because the injection pressure and the injection time are in an inverse proportion relationship, the greater the injection pressure, the shorter the injection time can be made. Moreover, by increasing the injection pressure, the effects of any measurement errors by the cylinder internal pressure sensor 132 can be absorbed, so that even more precise injection control can be achieved.

In the above-described embodiments, the fuel injection control unit 152 measures the pressure inside the cylinder 110 when the crank angle is 20°, and in accordance with this pressure, for example, causes the fuel injection valves 128 to inject the fuel gas 174 continuously from when the crank angle is 30° until it reaches 90°. However, the time from when the pressure inside the cylinder 110 is measured (i.e., 20°) until the injecting of the fuel gas 174 is started (i.e., 30°) is a short period of time, and when the engine load is large, in other words when the engine revolution speed is high, this period of time is extremely short. Therefore, based on the change in the pressure inside the cylinder 110 during any arbitrary stroke (for example, during the current stroke), the fuel injection control unit 152 may also decide at least one of the injection pressure and the injection time of the fuel injection valves 128 during the next stroke after that arbitrary stroke. By employing this method, the processing time for one stroke can be secured, and fuel gas can be supplied stably.

In the above-described two-stroke uniflow engine 100, even if the pressure inside the cylinder has been greatly changed by the engine load or the crank angle, by setting an appropriate injection pressure or injection time so as to correspond to this change, a suitable quantity of fuel gas can be supplied and stable combustion characteristics in the engine can be obtained.

While preferred embodiments of the invention have been described and illustrated above, it should be understood that these are exemplary of the invention and are not to be considered as limiting. Additions, omissions, substitutions, and other modifications can be made by one skilled in the art without departing from the spirit or scope of the present invention. Accordingly, the invention is not to be considered as limited by the foregoing description and is only limited by the scope of the appended claims.

For example, in the above-described embodiment, the pressure inside the cylinder 110 at a predetermined crank angle is used instead of the engine load, however, if it is possible to directly ascertain the engine load or the engine rotation speed, then it is also possible for that to be used directly in order to perform the internal pressure relative to crank angle decision processing S204. At this time, if the cylinder internal pressure sensor 132 is provided, then this can be used to confirm whether the measurement values from the cylinder internal pressure sensor 132 accurately follow the internal pressure relative to crank angle curve obtained from the internal pressure relative to crank angle curve decision processing S204, or to amend these to the correct values.

Moreover, in the above-described embodiment, the injection pressure was fixed and only the injection time was sought, however, the same control as was performed for the injection time can also be performed for the injection pressure. In this case, for example, a variety of methods may be considered such as performing control such that the differential pressure between the injection pressure and the values shown by the internal pressure relative to crank angle curve are constant, or such as altering the absolute value of the injection pressure in accordance with a mean value of the internal pressure relative to crank angle curve. In the same way as the injection time, by controlling the injection pressure in this way as well, it is possible to obtain stable combustion characteristics in the engine.

INDUSTRIAL APPLICABILITY

The present invention relates to a two-stroke uniflow engine that injects fuel directly into a cylinder.

DESCRIPTION OF REFERENCE SIGNS

110 . . . Two-stroke uniflow engine
110 . . . Cylinder
112 . . . Piston
116 . . . Exhaust port
120 . . . Exhaust valve
122 . . . Scavenging port
124 . . . Scavenging chamber
126 . . . Fuel injection ports
128 . . . Fuel injection valves
130 . . . Pressure governor
132 . . . Cylinder internal pressure sensor
150 . . . Governor
152 . . . Fuel injection control unit
174 . . . Fuel gas

The invention claimed is:

1. A two-stroke uniflow engine comprising:
a cylinder;
a piston that slides inside the cylinder;
an exhaust valve that is provided at one end portion in a stroke direction of the cylinder, and is opened and closed in order to discharge exhaust gas that is generated inside the cylinder;
a scavenging port that is provided in an internal circumferential surface at an end portion on the other side in the stroke direction of the cylinder, and takes active gas into the interior of the cylinder in accordance with the sliding movement of the piston;
a fuel injection port that is provided in the internal circumferential surface of the cylinder;
a fuel injection valve that injects fuel gas into the fuel injection port; and
a fuel injection control unit that executes control of the injection of the fuel gas in the fuel injection valve,
wherein the fuel injection control unit decides at least one of an injection pressure and an injection time of the fuel injection valve based on changes in pressure inside the cylinder that are caused by a reciprocating movement of the piston,
wherein the fuel injection control unit predicts the changes in the internal pressure in the cylinder based on the internal pressure in the cylinder when an angle of a crank that at converts the reciprocating movement of the piston into an axial rotation movement reaches a predetermined angle, and
wherein the predetermined angle is an optional angle between a point when the scavenging port changes to a closed state and a point when the fuel injection port changes to a closed state.

2. The two-stroke uniflow engine according to claim 1, wherein, based on the changes in pressure inside the cylinder during an arbitrary stroke, the fuel injection control unit decides at least one of the injection pressure and the injection time of the fuel injection valve during the next stroke after that arbitrary stroke.

* * * * *